United States Patent [19]
Kuroiwa

[11] Patent Number: 5,309,383
[45] Date of Patent: May 3, 1994

[54] FLOATING-POINT DIVISION CIRCUIT

[75] Inventor: Koichi Kuroiwa, Kawasaki, Japan

[73] Assignee: Fujitsu, Kawasaki, Japan

[21] Appl. No.: 946,316

[22] PCT Filed: Mar. 12, 1992

[86] PCT No.: PCT/JP92/00296

§ 371 Date: Nov. 9, 1992

§ 102(e) Date: Nov. 9, 1992

[87] PCT Pub. No.: WO92/16892

PCT Pub. Date: Oct. 1, 1992

[30] Foreign Application Priority Data

Mar. 13, 1991 [JP] Japan .................. 3-048452

[51] Int. Cl.$^5$ ........................... G06F 7/38; G06F 7/52
[52] U.S. Cl. ...................... 364/748; 364/761
[58] Field of Search ................... 364/748, 761

[56] References Cited

U.S. PATENT DOCUMENTS

| | | | |
|---|---|---|---|
| 4,760,550 | 7/1988 | Katzman et al. | 364/748 |
| 4,996,660 | 2/1991 | Beacom et al. | 364/748 |
| 4,999,801 | 3/1991 | Katsuno | 364/748 |

FOREIGN PATENT DOCUMENTS

| | | |
|---|---|---|
| 0110160 | 6/1984 | European Pat. Off. |
| 0158530 | 10/1985 | European Pat. Off. |
| 0171088 | 2/1986 | European Pat. Off. |
| 0208287 | 1/1987 | European Pat. Off. |
| 0356996 | 3/1990 | European Pat. Off. |
| 57-169849 | 10/1982 | Japan |

OTHER PUBLICATIONS

8084 IEEE Transactions on Acoustics, Speech, and Signal Processing, vol. 36, No. 2, Feb. 1988, New York, N.Y., USA, *Architectural Strategies for an Application-Specific Synchronous Multiprocessor Environment*, F. Catthoor et al., pp. 265-238.

Patent Abstract of Japan, JP3091028, Apr. 16, 1991.

*Primary Examiner*—Tan V. Mai
*Attorney, Agent, or Firm*—Staas & Halsey

[57] ABSTRACT

A floating-point division circuit for performing division on floating-point data using a non-recovery type division method is disclosed. The floating-point division circuit includes a circuit portion for conducting a pre-division processing and pattern determination on a dividend and a divisor, an exponent operation portion, a mantissa division portion, and a quotient generating portion, further including either or both of an exception/non-operation detecting portion and a control portion. The exception/non-operation detecting portion generates a stop signal when detecting a non-operation pattern so as to stop a repetition of operations in the mantissa division portion. The control portion generates either a non-executional signal or a control signal so as to stop a latch operation during a period when no instruction for division is executed.

18 Claims, 13 Drawing Sheets

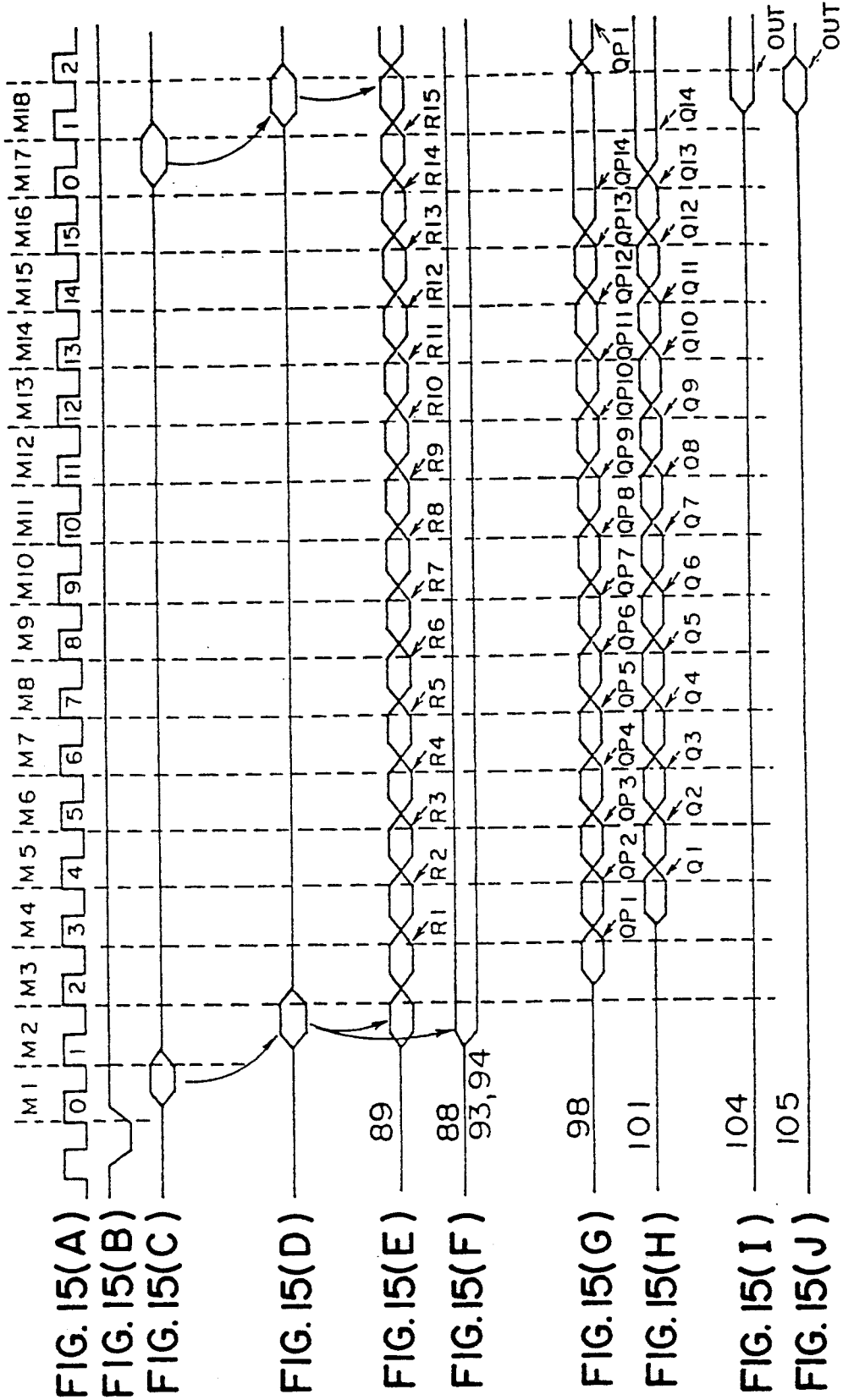

FLOATING-POINT DIVISION CIRCUIT

FIELD OF THE INVENTION

The present invention relates to a floating-point division circuit, and more particularly to a division circuit for performing division of floating-point data defined by the Institute of Electrical and Electronics Engineers (IEEE) standard.

A vector arithmetic unit in a vector processor performs addition, subtraction, multiplication, and division of vector data. Such a vector arithmetic unit is mounted in a large scale semiconductor circuit (LSI) and division of vector data is conventionally performed by a multiplication circuit thereof. Since it is desirable, in terms of increasing the speed and operational precision of a vector processor, that each of the arithmetic operations be performed in a parallel manner by specialized circuits, recently division circuits have been provided separately from multiplication circuit.

However, providing a division circuit separately from a multiplication circuit leads to increased power consumption of LSI due to the addition of a division circuit. This increase necessitates a reduction in power consumption of a division circuit.

BACKGROUND ART

A floating-point division circuit executes an instruction for division by repeating a recursive procedure defined by the following equation.

$$R(j + 1) = r \times R(j) - q_{j+1} \times D \qquad (1)$$

In the above equation, j represents an exponent of a recurrence formula and is either 0 or an integer in the range of 1 to n−1, D a divisor, $q_{j+1}$ a (j + 1)th quotient digit counting from a decimal point ($q_0$ is a sign), n a digit length of a quotient, r a radix, $r \times R(j)$ a partial dividend before the (j + 1)th quotient digit is determined, R (j + 1) a partial remainder after the (j + 1)th quotient digit is determined, R (0) a dividend (initial value of the partial dividend), R (n) a final remainder.

The quotient Q is expressed by a series of (n + 1) quotient digits $q_0 - q_n$, as shown in the following equation.

$$Q = q_0, q_1, q_2, \ldots, q_{n-1}, q_n \qquad (2)$$

Accordingly, most of the time needed for an execution of a division is spent on a repetition of the above-mentioned recursive procedure. One approach to reduce the repetitions of this recursive procedure, so that division is speedily performed, is known as a non-recovery type division method. In this non-recovery type division method, attention is paid to the fact that a set of quotients used for generating a quotient digit $q_{j+1}$ could be a set of signed quotients not including 0, before selecting the quotient digit from the quotient set. Assuming that r is a radix, the above-mentioned set of signed quotients can be given by:

$$-0 (r-1), -(r-2), \ldots, -1, +1, \ldots, r-2, r-1$$

This non-recovery type division method is characterized in that negative numbers are allowed to represent digits of the result of an operation by not recovering a reversal from positive to negative dividend, the reversal arising when determining each digit of the result of the operation; and that the divisor or a multiple of the divisor is added to or subtracted from the digit, depending on the sign of the dividend; the method is hence called a separation method.

In this method, a quotient is obtained by first placing, in a divisor register, a data for a multiple of the divisor that is k times the divisor (obtained by multiplying the divisor by each quotient of the above-mentioned set of signed quotients), selecting the above-mentioned divisor register on the basis of a prediction signal output from a quotient predicting device, and repeating addition or subtraction of the multiple of the divisor that is k times the divisor.

One variation of this non-recovery type division method, employed when a faster and more accurate division is to be performed, is known as a large-radix non-recovery division method that reduces the number of loops of division by increasing the radix r so that the number of bits that serve as an operation unit is relatively large.

A division circuit of this configuration can speed up an operation of a vector processor by having a division circuit running parallel with an addition circuit, a subtraction circuit, and a multiplication circuit. It should be noted, however, that addition, subtraction, multiplication, and division circuits do not receive an operation instruction all the time; there are times when they are not performing any operation. Electric power could be wasted because even when these circuits are at rest and performing no operations, merely inputting a clock signal thereto activates the circuits.

Accordingly, at a period of time when the addition, subtraction, multiplication, and division circuits are at rest and performing no operations, internal data in each circuit is maintained in a fixed status by omitting the latching of an input data by means of an input latch; power consumption is controlled by controlling the switching of transistors contained in each circuit.

In a division circuit employing a large-radix non-recovery type division method, the switching of transistors contained in the circuit cannot be controlled merely by fixing an input data by means of an input latch carried out in the absence of a division instruction, because the above-mentioned separation method is employed in this method in order to obtain a higher operation speed and is configured such that loops are executed internally. Thus, unlike the other circuits, the division circuit is not capable of keeping, even in the absence of a division instruction, the switching operations of the transistors therein from being performed due to an input clock, the switching operations being carried out just as when an instruction for division is input. Thus it is not only that power consumption cannot be controlled, power consumption even increases because the clock frequency therein is set at a high rate for speedy operation.

The present invention was developed in view of the above disadvantage and has an object of providing a floating-point division circuit in which the above disadvantage is eliminated by halting the operation of a quotient generating portion at least when no instruction for division is input.

Another object of the present invention is to provide a floating-point division circuit capable of outputting, when a pattern that is not of an arithmetic operation is detected during execution of an instruction for division, a prescribed pattern after halting an operation of a quotient generating portion.

SUMMARY OF THE INVENTION

In order to achieve the above objects, the floating-point division circuit of the present invention is configured to comprise:

a circuit portion for conducting a pre-division processing and pattern determination on each of floating-point data, namely a divisor and a dividend;

an exponent operation portion for performing an operation on exponent parts of floating-point data, namely the divisor and the dividend subject to pre-processing;

an exception/non-operation detecting portion for determining a predetermined non-operational pattern on the basis of a result of pattern determination obtained in the circuit portion with regard to the divisor and the dividend, and for generating a stop signal when the non-operational pattern is detected;

a mantissa division portion into which mantissa parts of floating-point data, namely the divisor and the dividend subject to pre-processing, are input wherein procedures based on a predetermined algorithm are repeated in order to generate a mantissa part data of a quotient; and quotient generating portions for generating a a quotient consisting of a predetermined number of bits on the basis of output data from said exponent operation portion, exception/non-operation detecting portion, and mantissa division portion.

According to the present invention, power consumption in a mantissa division portion is reduced at the time a non-operational pattern is detected because a latch operation of a register is halted in the mantissa division portion by a stop signal so that repeated operation in the mantissa division portion is halted.

Also, the present invention is equipped with a control portion for generating, which portion is rendered active only when an instruction for division is not executed. According to the present invention, power consumption in circuits not being engaged in execution of an instruction for division, is lowered because a latch operation of a register in the mantissa division portion is halted by a non-executional signal.

Further, the present invention is configured to output, when an instruction for division is executed, a control signal on the basis of a count obtained by counting clocks; and to maintain the count, when an instruction for division is not executed, at a fixed value by halting the counting, thereupon invalidating the above-mentioned control signal. In accordance with the present invention, since a latch operation of a register in a quotient generating circuit, where a latch operation is controlled by the above-mentioned control signal, is halted during a time when there is no instruction for division executed, power consumption of the circuit is reduced when there is no instruction for division executed. Accordingly, the present invention can be best applied to a division circuit employing a large-radix non-recovery type division method, which, while enabling a high-speed division, tends to require a

BRIEF DESCRIPTION OF THE DRAWINGS

FIGS. 15(A)-15(J) illustrate a time chart describing an operation in FIG. 3.

DESCRIPTION OF THE PREFERRED EMBODIMENTS

Figure 1:
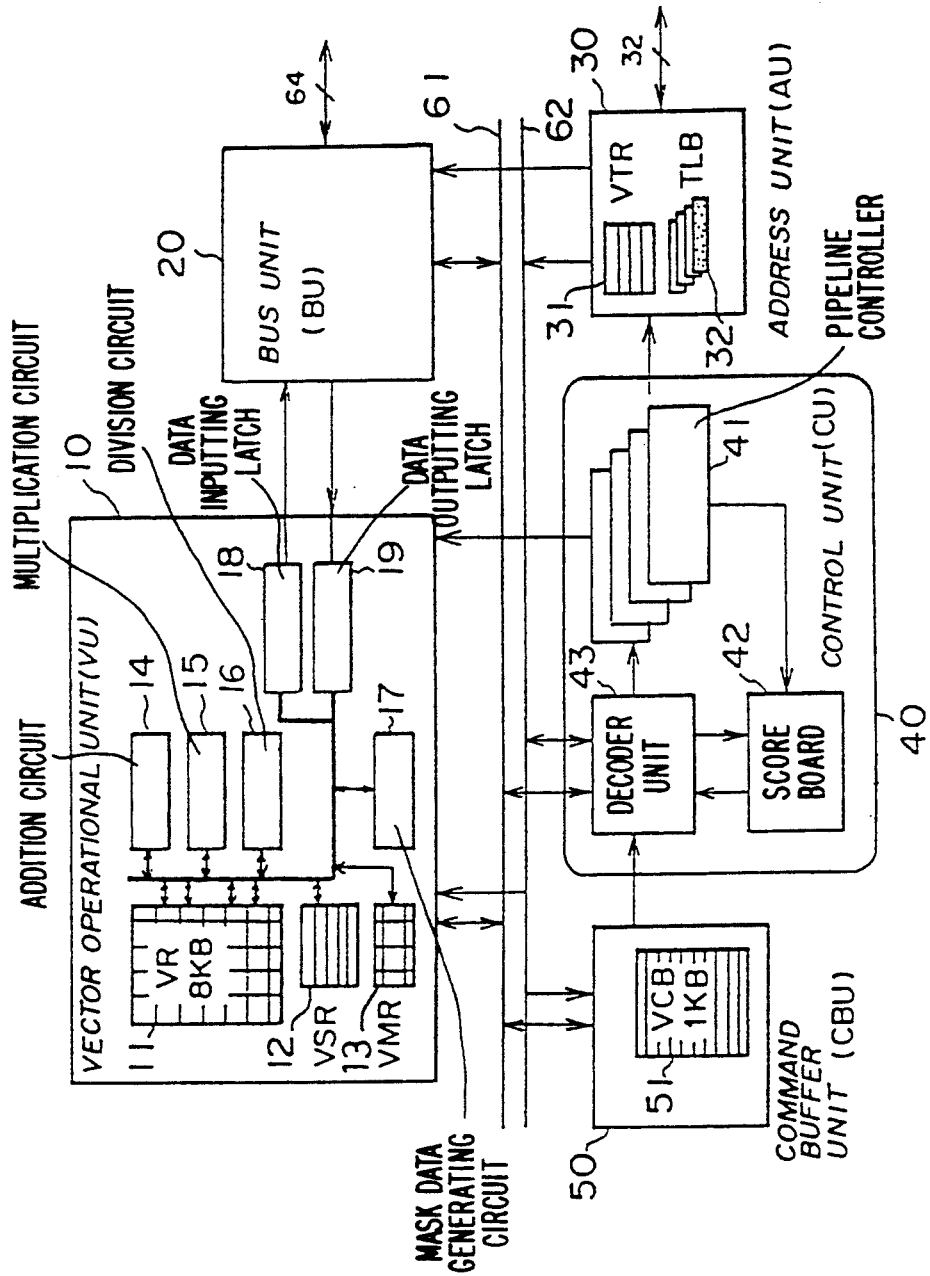
FIG. 1 is a diagram depicting an overall configuration of a vector processor.

The floating-point division circuit of the present invention is employed in a vector processor of a configuration depicted in FIG. 1, for example. As shown in the figure, a vector processor comprises a vector arithmetic unit (VU) 10, a bus unit (BU) 20, an address unit (AU) 30, a control unit 40, and a command buffer unit (CBU) 50, and these units are interconnected via a data bus 61 and an address bus 62.

The vector arithmetic unit 10 comprises a vector register (VR) 11 for storing vector data, scalar register (VSR) 12 for storing scalar data, a vector mask register (VMR) 13 for storing mask data, an addition circuit 14, a multiplication circuit 15, a division circuit 16, a mask data generating circuit 17, a data inputting latch 18, and a data outputting latch 19. The division circuit 16 is a floating-point division circuit of the present invention.

A 64-bit data is input into or output from the bus unit 20. A 32-bit address is input into or output from the address unit 30. The control unit 40 comprises a pipeline controller 41, a score board 42, and a decoder unit 43. The command buffer unit 50 has a vector command buffer (VCB) 51 having a capacity of 1 kilobyte.

A description of an operation of this vector processor will be given below. The vector command buffer (VCB) 51 stores instructions. An address for the data to perform an operation on is generated by a load instruction in an address unit 30, after which an external memory is accessed. The relevant data is then input, via the bus unit 20, through the data inputting latch 18 in the vector arithmetic unit (VU) 10 and stored in the vector register (VR) 11. When the address unit 30 generates the address, a vector translation register (VTR) 31 and a translation lookaside buffer (TLB) 32 are utilized in a conversion from a virtual address to a physical address.

When an instruction is stored in the VCB 51, the vector processor is activated by the writing of "1" into a start bit position of a command start register (not shown) in the CPU 40. The CPU then decodes the instruction in the VCB 51 by means of a decoder unit 43, and notifies the VU 10 which of the instructions in the pipelines of the VU 10 is pertinent. The decoding by the decoder unit 43 is performed once in every cycle, meaning that it is restarted once in every cycle.

It could happen that different arithmetic units share the vector register 11. Such sharing is checked by the pipeline controller 41 and the score board 42 in the CPU 40. The restarted arithmetic units in the VU 10 (the addition circuit 14, the multiplication circuit 15, the floating-point division circuit 16, and the mask data generating circuit 17) execute an operation. The result of the above operation is stored in the external memory on the basis of a storing instruction.

Figure 2:
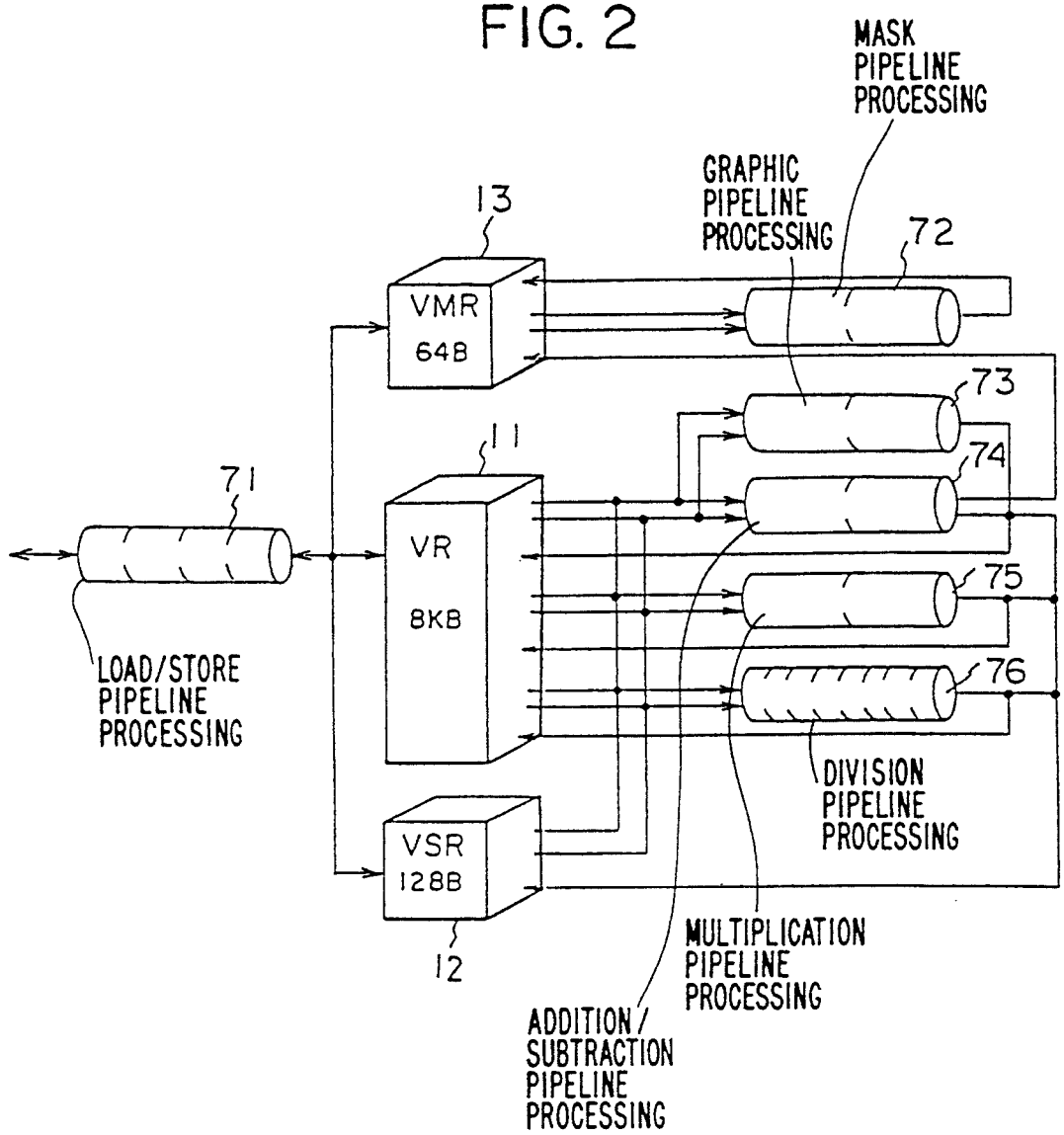
FIG. 2 is a diagram describing execution of arithmetic operations in a vector arithmetic unit of FIG. 1.

As shown in FIG. 2, arithmetic processings in the VU 10 include a load/store (L/S) pipeline processing 71, a mask pipeline processing 72, a graphic pipeline processing 73, an addition/subtraction pipeline processing 74, a multiplication pipeline processing 75, and a division pipeline processing 76.

The mask pipeline processing 72 is performed by the mask data generating circuit 17, which exchanges, with the vector mask register 13, data for omission of operations. The graphic pipeline processing 73 is a pipeline processing of graphical data and is selectively performed, with the addition/subtraction pipeline processing 74, by the addition circuit 14. The multiplication pipeline processing 75 is performed by the multiplication circuit 15. The division pipeline processing 76 is performed by the floating-point division circuit 16.

As is evident from the above, the floating-point division circuit 16 is provided, in the VU 10, separately from the multiplication circuit 15 so that the division pipeline processing 76 is performed in parallel with the addition/subtraction pipeline processing 74 and multiplication pipeline processing 75.

Figure 3:
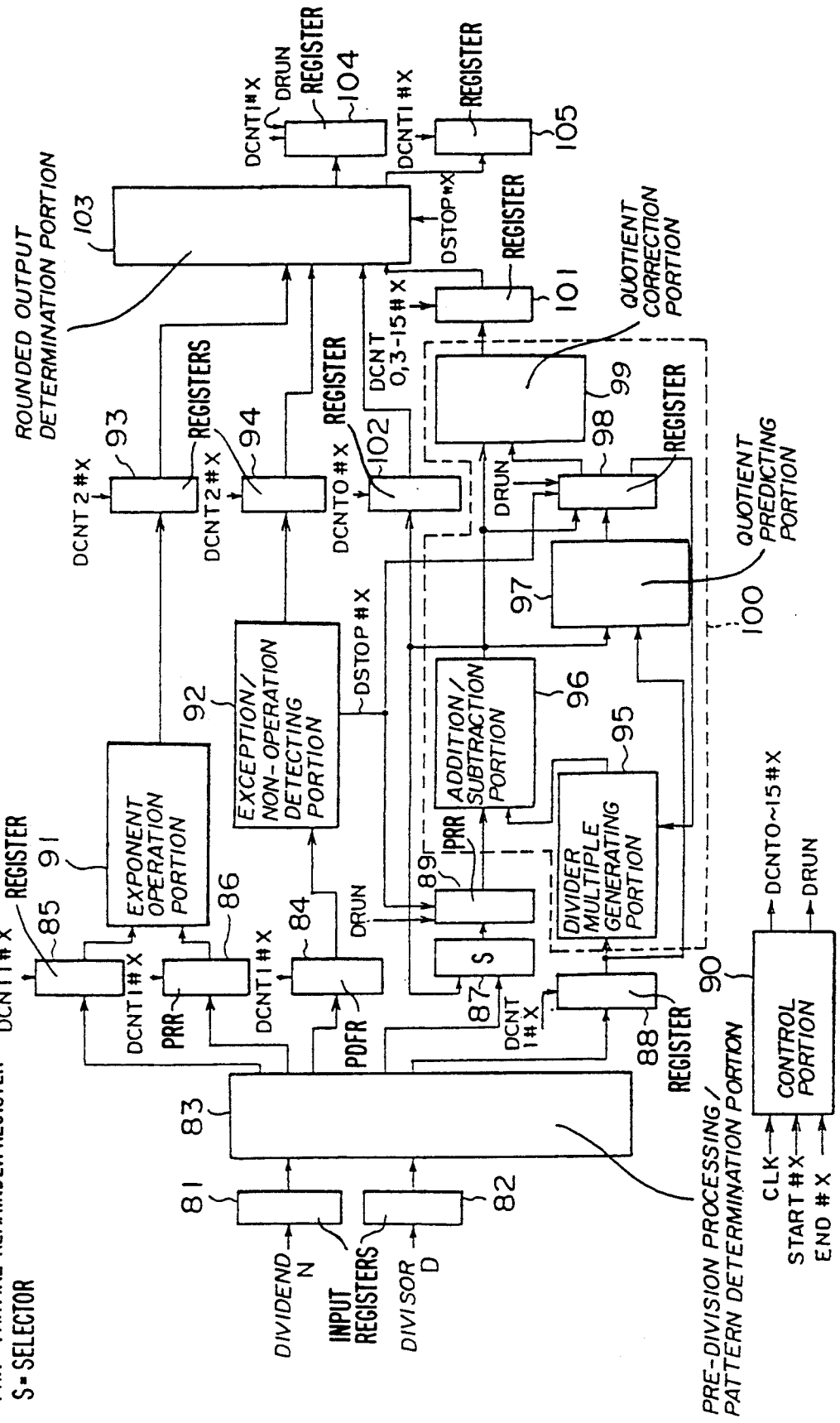
FIG. 3 is a diagram depicting an overall configuration of an embodiment of the present invention.

A description will be given below of a configuration and an operation of an embodiment of the present invention which is utilized as the floating-point division circuit 16 above. FIG. 3 is a diagram depicting an overall configuration of an embodiment of the present invention. This embodiment is a floating-point division circuit for performing division of floating-point data defined by the IEEE standard, by employing a large-radix non-recovery type division method. The floating-point data format defined by the IEEE standard includes 32-bit single-precision format and 64-bit double-precision format. In this embodiment, a double-precision floating point data is input as a dividend N and a divisor D.

In a double-precision floating-point data, from the highest-order bit toward the lowest-order bit, a one-bit sign S, an 11-bit exponent part EXP, and a 52-bit mantissa part M are arranged. After being temporarily retained in input registers 81 and 82 respectively, the dividend N and the divisor D, which are both in the form of this floating-point data, are supplied to pre-division processing/pattern determination portion 83, by which they are determined to be either nonnumeric, zero, infinity, or normal, and are subject to pre-processing.

The result of determination by the pre-division processing/pattern determination portion 83 is set in a pattern determination flag register 84. The pre-processing portion of the pre-division processing/pattern determination portion 83 recovers hidden bits by extracting the respective mantissa part from the dividend N and the divisor D in the form of a floating-point data, setting the absolute value of the mantissa part of the dividend N to be smaller than the absolute value of the mantissa part of the divisor D. As described later, this is to set the eleventh bit, the hidden bit, of the quotient to be "1" to eliminate the need for a left shift otherwise required for the purpose of normalization so that the bit used as the mantissa part of the final quotient is designated as the specific bit of the partial quotient. The above-mentioned hidden bit is one bit higher than the highest-order bit of the mantissa part M when a procedure of normalization is taken according to the IEEE standard.

Figure 4:
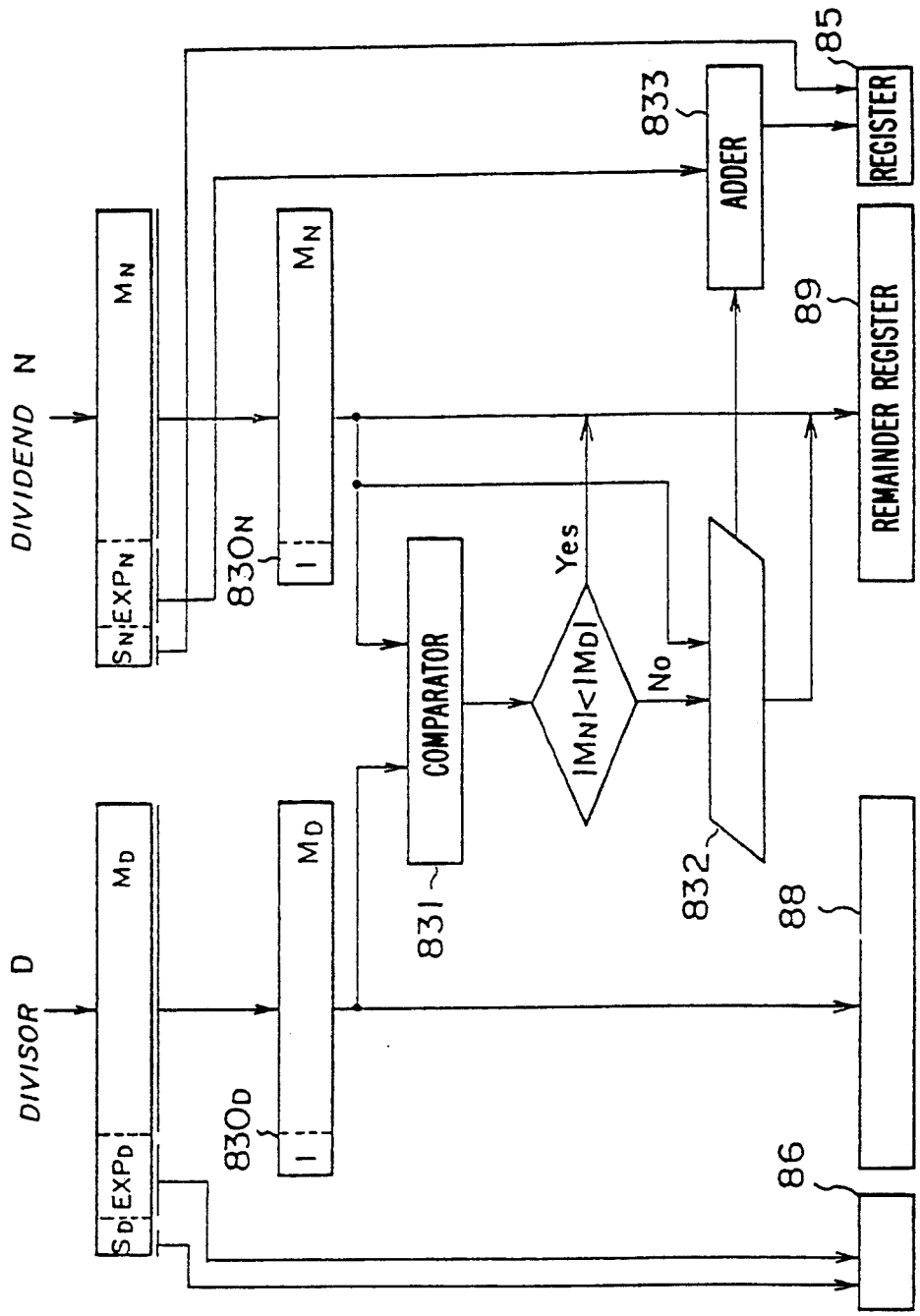
FIG. 4 is a diagram describing execution of pre-processing in a pre-division processing/pattern determination portion.

A further description will be given of an operation of the pre-processing portion of the pre-division processing/pattern determination portion 83 by referring to a schematic diagram of FIG. 4. In FIG. 4, parts that are the same as parts in FIG. 3 are given the same notation numerals as in FIG. 3. Referring to FIG. 4, the mantissa parts $M_N$ and $M_D$ of the dividend N and the divisor D respectively set in the input registers 81 and 82 are extracted so that the hidden bits $830_N$ and $830_D$ are recovered.

These two 53-bit data are then compared by a 53-bit comparator 831; if the absolute value $|M_N|$ of the mantissa part $M_N$ is smaller than the absolute value $|M_D|$ of the mantissa part $M_D$, a data, consisting of a total of 53 bits and containing the corresponding hidden bit and the exponent $M_N$, is set in a partial remainder register 89. On the other hand, if $|M_N| \geq |M_D|$, a 53-bit data consisting of the corresponding hidden bit and the mantissa part $M_N$ are shifted one bit to the right to be curtailed one bit, after which the data is set in the remainder register 89. At the same time as this, "1" is added to the exponent part $EXP_N$ of the dividend N by a +1 adder 833 when $|M_N| \geq |M_D|$, and the sum is set in the register 83. A sign $S_N$ of the dividend N is set in a register 85 and a sign $S_D$ of the divisor D is set in the register 86.

Although omitted in FIG. 4, a selector 87 is provided in the input area of the partial remainder register 89, as shown in FIG. 3. In this embodiment, the number of times division is repeated is 15 for a 53-bit mantissa part data, including a hidden bit; the quotient obtained thereof is of 56 bits (= 4 bits × 14 digits). As shown in FIG. 4, at the first of these 15 repetitions of division, the above-mentioned selector 87 selectively outputs the 53-bit mantissa part data from the pre-division processing portion to the partial remainder register 89; at the second through fifteenth divisions that follow the 53-bit data from an adder/subtracter portion 92 to be described later is selectively output to the partial remainder register 89.

The present embodiment is characterized in that it generates a stop signal DSTOP#X as well as generating a non-executional signal DRUN by the controller 90, and in that it selects, on the basis of these signals, operation/non-operation of the partial remainder register 89, a quotient predicting register 96, and a register 104, the latter two being described later.

Figure 5:
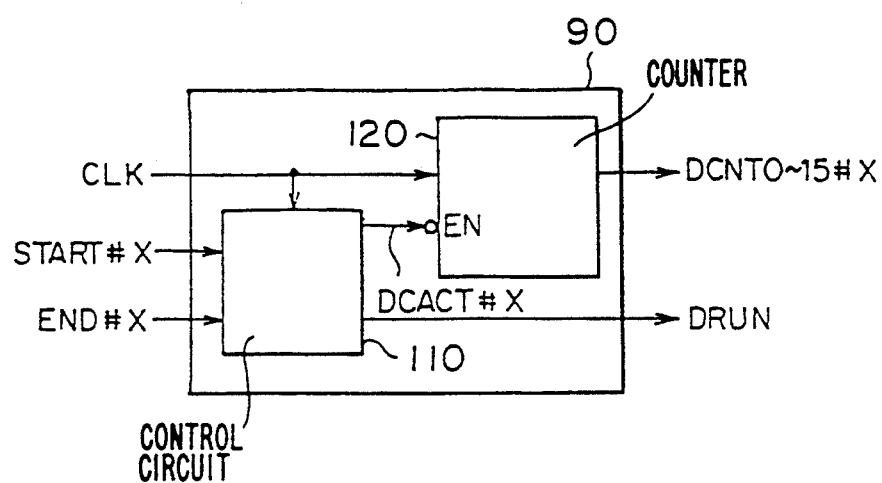
FIG. 5 is a block diagram of a control portion of FIG. 3.
Figure 6:
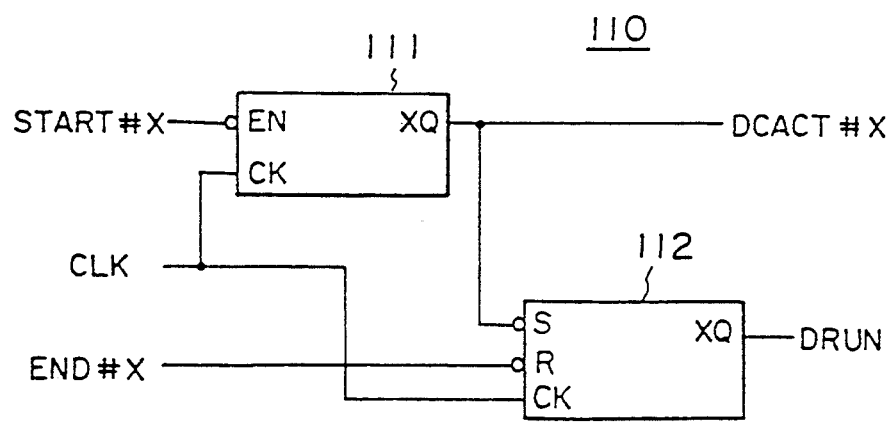
FIG. 6 is a circuit diagram of an embodiment of a control circuit of FIG. 5.

As shown in FIG. 5, the above-mentioned controller 90 comprises a control circuit 110 and a counter 120. The control circuit 110 is configured as shown in FIG. 6. Referring to FIG. 6, the control circuit 110 comprises a flip-flop 111 which receives an input of a start-of-division signal START#X at its enable terminal and receives an input of clock CLK at its clock terminal, and a flip-flop 112 which receives an input of an output signal XQ from the flip-flop 111 at its set terminal, receives an input of an end-of-division signal END#X at its reset terminal, and receives an input of a clock CLK at its clock terminal.

Figure 7:
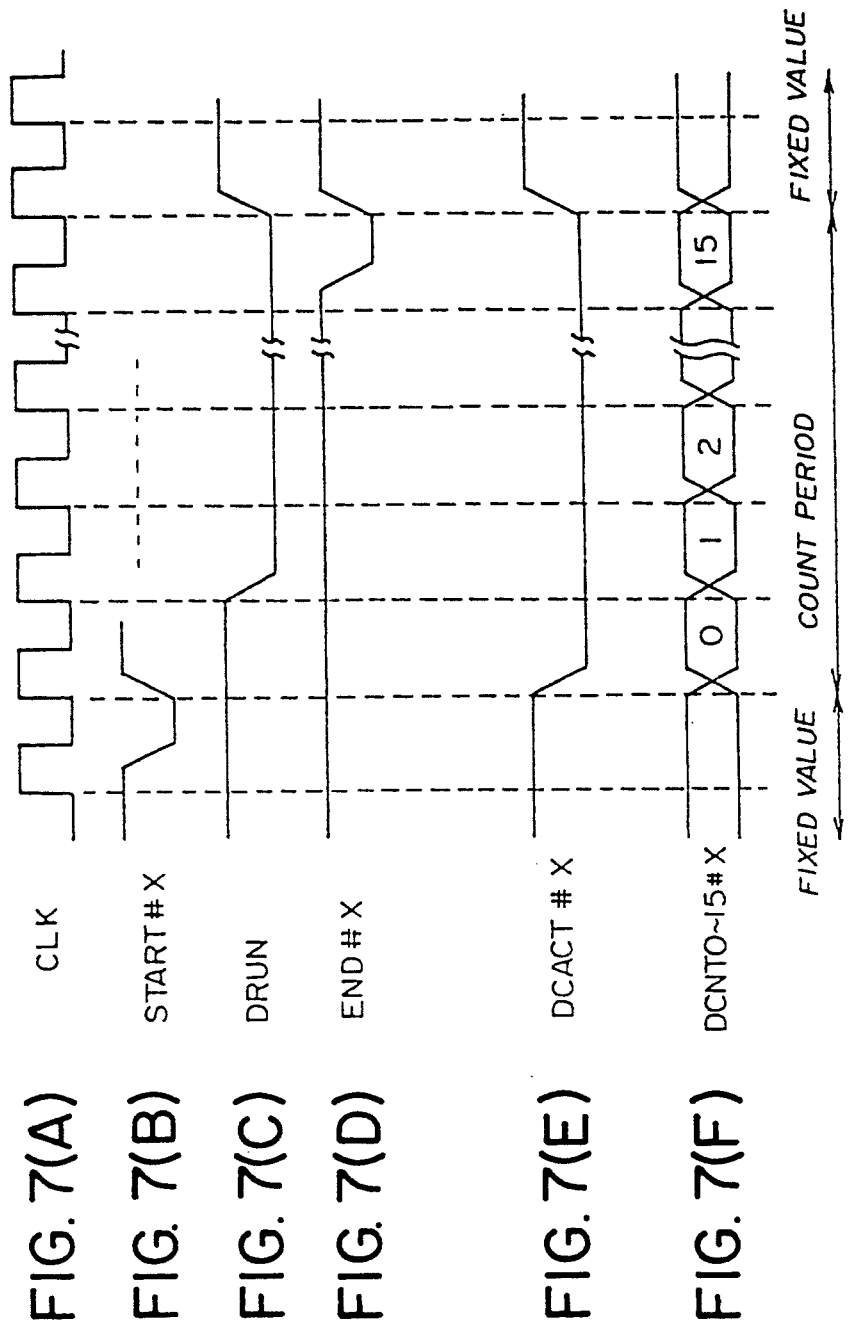
FIGS. 7(A)-7(F) illustrate a time chart describing an operation performed in FIGS. 5 and 6.

A description will be given below of an operation of this control circuit 110 by referring to the time chart of FIG. 7. As shown in FIG. 7 (B), when the start-of-division signal START#X becomes active (L level), the flip-flop 111 outputs, as shown in FIG. 7 (E), an L level control signal DCACT#X from an XQ output terminal thereof at the next rise of the clock CLK shown in FIG. 7 (A).

The flip-flop 112 is put into a set status at the rise of the clock CLK immediately after the above-mentioned control signal DCACT#X becomes active (L level), subsequently outputting the L level non-executional signal DRUN from the XQ output terminal, as shown in FIG. 7 (C). Thereafter, as shown in FIG. 7 (D), when the end-of-division signal END#X is input into the reset terminal of the flip-flop 112, the flip-flop 112 is put into a reset status at the next rise of the clock CLK, subsequently outputting the H level non-executional signal DRUN from the XQ output terminal, as shown in FIG. 7 (C).

As shown in FIG. 5, the above-mentioned control signal DCACT#X is applied to an enable terminal of the counter 120. While the signal is maintained at L level, the counter 120 counts the clocks CLK, as shown schematically in FIG. 7 (F). When the control signal DCACT#X is at H level, the counter 120 discontinues counting.

Accordingly, the control portion 90 not only outputs control signals DCNT0 - 15#X on the basis of the count obtained by counting the clocks CLK during execution of a division instruction that begins at the moment when the start-of-division signal START#X becomes active (L level) and ends at the moment when the end-of-division signal END#X becomes active (L level), but also negates (put into L level) the non-executional signal DRUN.

Further, the control portion 90 negates the control signal DCACT#X when the end-of-division signal END#X becomes active, discontinuing the counting operation of the counter 120 so that the count of the counter 120 becomes fixed, and negating the control signals DCNT0 - 15#X based on the count.

As shown in FIG. 3, DCNT1#X, one of the control signals based on the count, is input into the registers 84–86, 88, 104, and 105; DCNT2#X is input into registers 93 and 94 to be explained more fully later; DCNT0#X is input into registers 101 and 102 to be explained more fully later; DCNT3 - 15 #X are input into the quotient register 101 for a latch operation to start. Further, the non-executional signal DRUN output from the control portion 90 is input into the registers 89, 98, and 104.

As shown in FIG. 3, the sign $S_N$ and the exponent part $EXP_N$ stored in the register 85 shown in FIG. 3, as well as the sign $S_D$ and the exponent part $EXP_D$ stored in the register 86 are supplied to the exponent operation portion 91 for operation. The pattern determination data that is set in the register 84 is supplied to the exception/non-operation detecting portion 92 for determination of exception. When a decision of exception is given, the stop signal DSTOP#X and the prescribed pattern are output, as will be described later.

Figure 8:
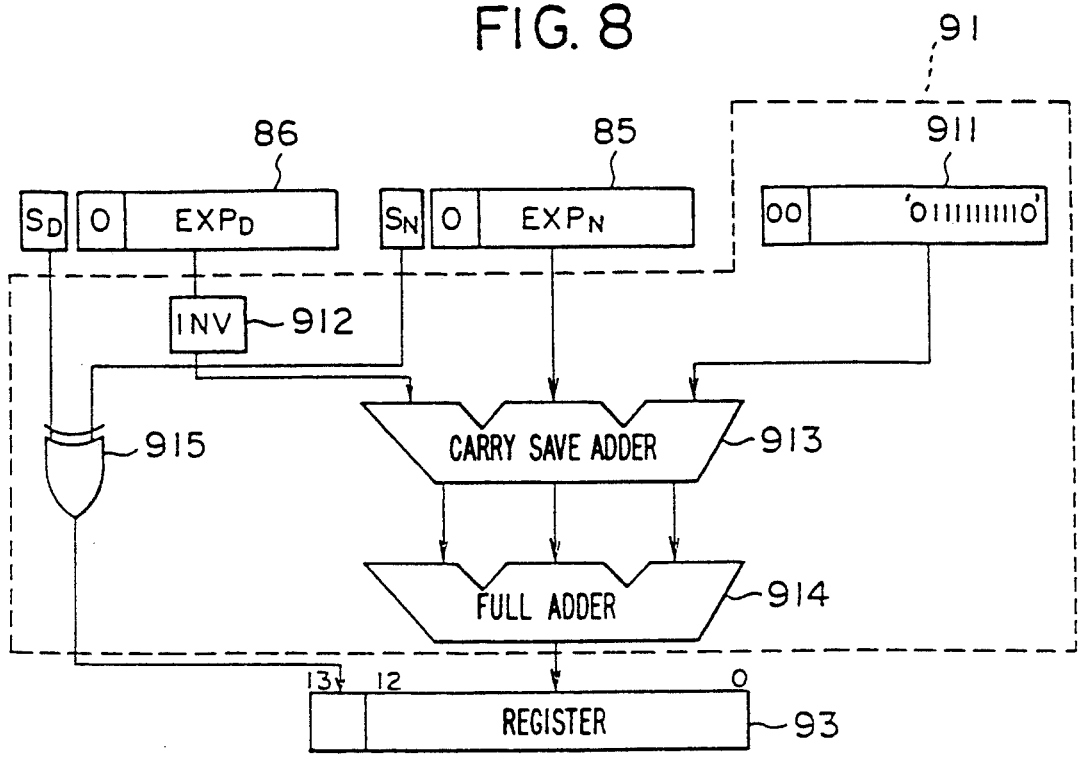
FIG. 8 is a diagram depicting a configuration of an embodiment of an exponent operation portion of FIG. 3.

As shown in FIG. 8, the above-mentioned exponent operation portion 91 comprises, for example, a register 911 that stores a bias value, an inverter 912 for obtaining a value of a complement, a carry save adder 913, a full adder 914, and a 2-input XOR circuit 915. The exponent part EXP of the double-precision floating-point data according to the IEEE standard has 11 bits, as mentioned earlier. In this embodiment, it is assumed that the exponent part EXP is represented as a complement of 2. A bias value is a value for use in a biased representation of the exponent part EXP and is fixed at "1023".

The exponent part $EXP_D$ of the divisor set in the register 86 is complemented by the inverter 912, and is thereafter supplied to the carry save adder 913 at which it is added both to the exponent part $EXP_N$ of the dividend from the register 85 and to the bias value from the register 911; it is then forwarded for addition operation at the full adder 914, the result of the addition thereof being stored in the register 93. Prior to this addition, "0" is appended to a position one bit higher than the highest-order bit, to prevent bit overflow.

On the other hand, the sign $S_N$ of the dividend N set in the register 85 and the sign $S_D$ of the divisor D set in the register 86 are XORed at the 2-input XOR circuit 915 and are set at the register 93.

Figure 9:
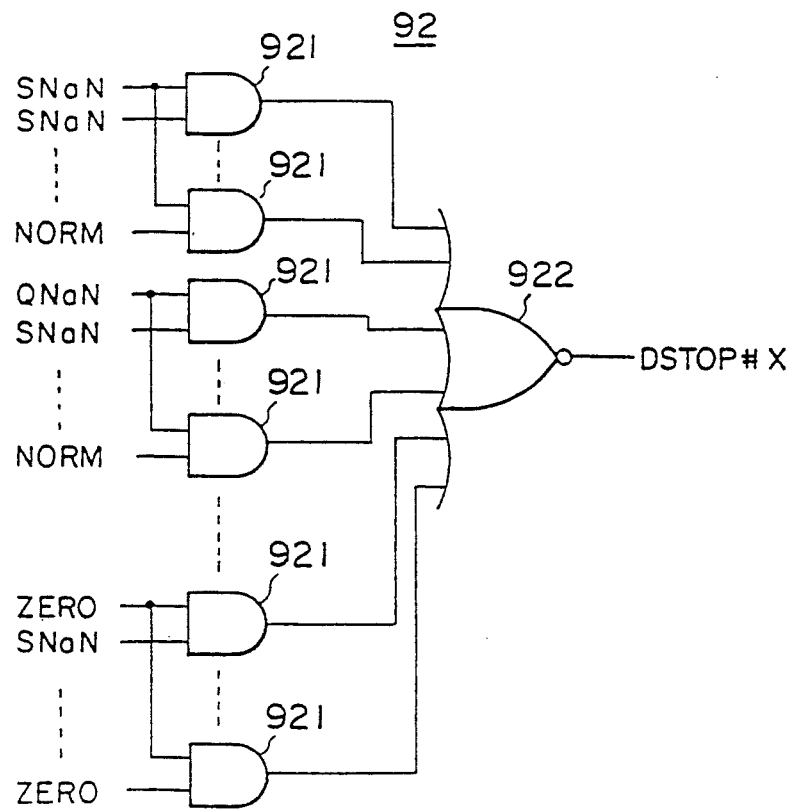
FIG. 9 is a circuit diagram of a main portion of an exception/non-operation detecting portion of FIG. 3.

A description of a configuration and an operation of the exception/non-operation detecting portion 92 shown in FIG. 3 will be given below. The exception/non-operation detecting portion 92, the main part of whose circuit configuration is shown in FIG. 9, is a circuit portion for determining exceptions including a zero division exception and an invalid operation exception, and for detecting a non-operation. One of the two input terminals provided in each of 25 sets of 2-input AND circuits 921 receives, from the register 84, an input of a pattern determination flag determined on the basis of the data of the divisor D; the other input terminal of each of the 2-input AND circuits 921 receives, from the register 84, an input of the pattern determination flag determined on the data of the dividend N.

Patterns that the above-mentioned pattern determination flag exhibits include SNaN (Signaling Not A Number) and QNaN (Quiet Not A Number), infinity (INF), zero (ZERO), and normal (NORM) (IEEE 754-1985 standard), the first two being nonnumerics. The exception/non-operation detecting portion 92 detects, on the basis of these input pattern flags, non-operation patterns listed below and generates a stop signal DSTOP#X when a non-operation pattern is detected.

| | | | | |
|---|---|---|---|---|
| SNaN÷SNaN | QNaN÷SNaN | INF÷SNaN | NORM÷SNaN | ZERO÷SNaN |
| SNaN÷QNaN | QNaN÷QNaN | INF÷QNaN | NORM÷QNaN | ZERO÷QNaN |
| SNaN÷INF | QNaN÷INF | INF÷INF | NORM÷INF | ZERO÷INF |
| SNaN÷ZERO | QNaN÷ZERO | INF÷ZERO | NORM÷ZERO | ZERO÷NORM |
| SNaN÷NORM | QNaN÷NORM | INF÷NORM | NORM÷NORM | ZERO÷ZERO |

Each of the AND circuits 921 is a circuit for detecting each of the above 25 non-operation patterns; when any one or more of these non-operation patterns are input, the output from the corresponding AND circuit 921 is brought to an H level. The H-level output signal from the AND circuits 921 is output via a 25-input NOR circuit 922 as an L-level stop signal DSTOP#X.

Figure 10:
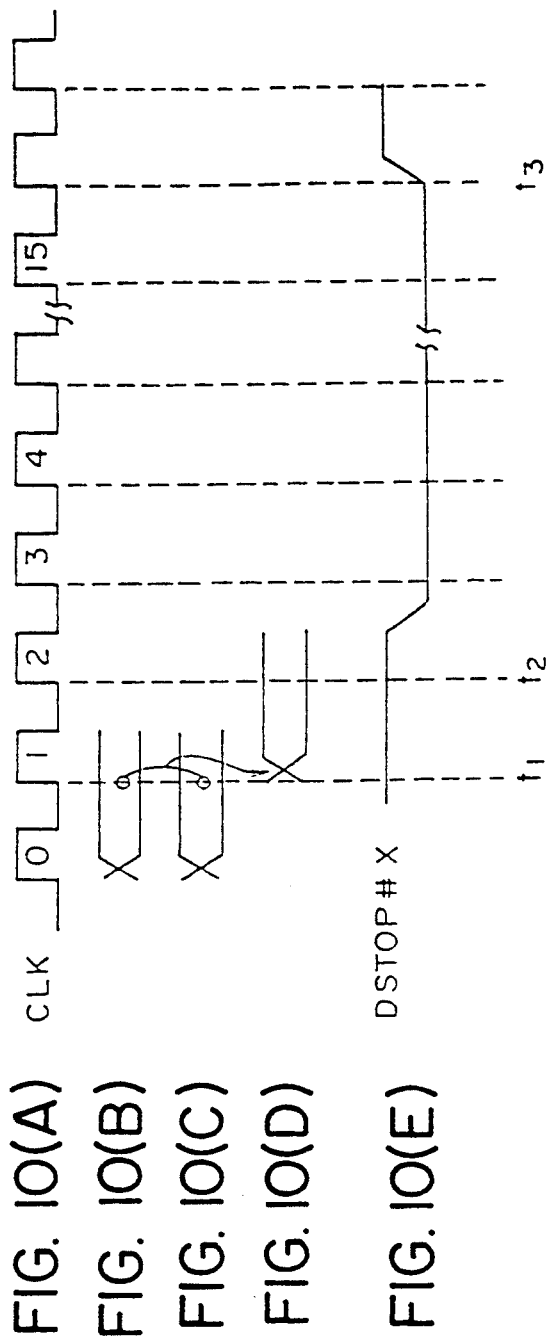
FIGS. 10(A)-10(E) illustrate a time chart describing an operation of an exception/non-operation detecting portion of FIG. 3.

For example, when a pattern flag ZERO of the dividend data shown in FIG. 10 (B) and a pattern flag INF of the divisor data shown in FIG. 10 (C) are set at the same time $t_1$ in the register 84 in synchronization with clocks shown in FIG. 10 (A), the exception/non-operation detecting portion 92 detects the non-operation pattern ZERO÷INF, as shown in FIG. 10 (D) schematically, and generates an L-level stop signal DSTOP#X, as shown in FIG. 10 (E), immediately after the next clock is input at the time $t_2$.

While an illustration is omitted in FIG. 9, the above-mentioned stop signal DSTOP#X is maintained at an L-level (active) until it is put into an H level at an end-of-operation time $t_3$, as shown in FIG. 10 (E). When the exception/non-operation detecting portion 92 detects an exception or a non-operation, it generates a corresponding prescribed pattern and stores the pattern in the exception register 94 shown in FIG. 3.

Figure 11:
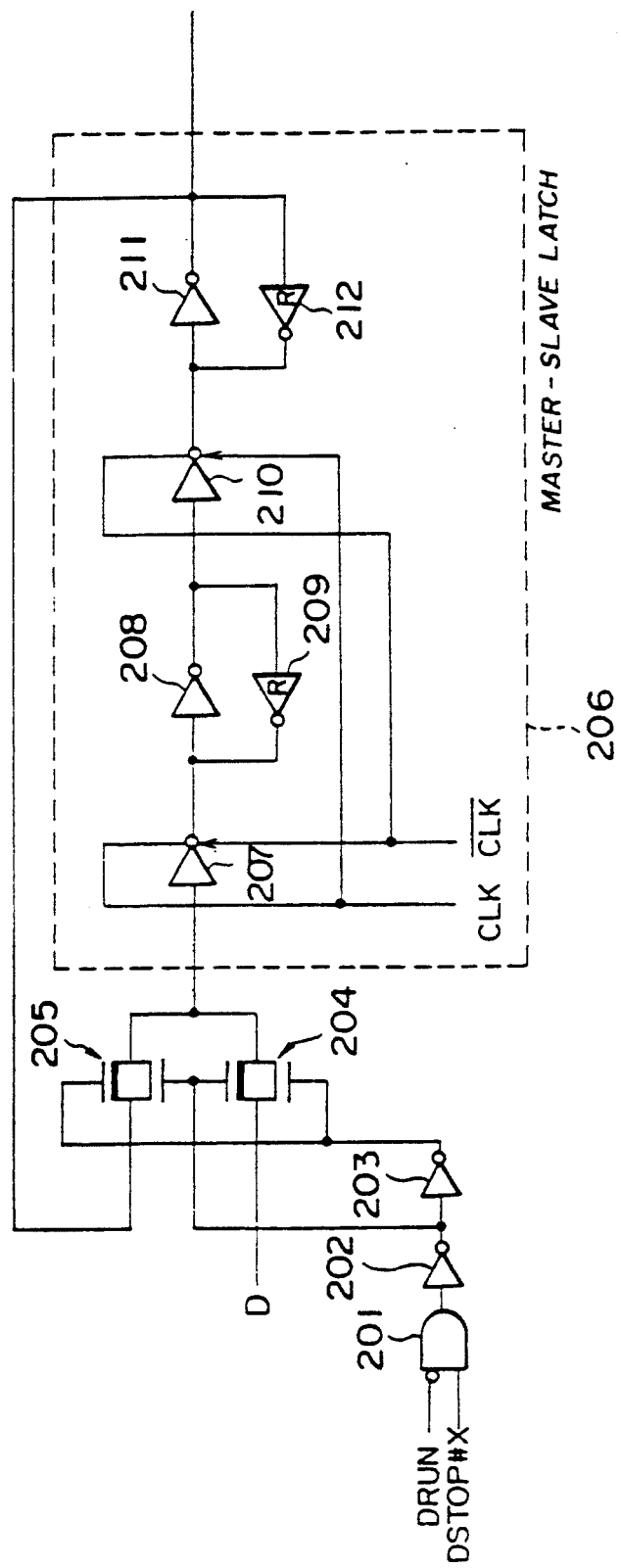
FIG. 11 is a circuit diagram of a partial remainder register and a predicted quotient register of FIG. 3.

A description will be given of a configuration and operation of the registers 89 and 98, into which the above-mentioned stop signal DSTOP#X and the aforementioned non-executional signal DRUN are input as enable signals. The registers 89 and 98 are of the same circuit configuration as the one shown in FIG. 11. Referring to FIG. 11, a gate circuit 201 receives inputs of a stop signal DSTOP#X and a non-executional signal DRUN, outputs an H-level signal only when DSTOP#X is at H level (negate) and DRUN is at L level (negate), and outputs an L-level signal when either DSTOP#X or DRUN is active.

The gate circuit 201 is connected to each one of the two input terminals provided in each of transmission gates 204 and 205 via an inverter 202, further being connected to each of the other input terminals provided in each of the transmission gates 204 and 205 via an inverter 203. The transmission gate 204 is turned on when the output signal from the inverter 202 is at an L level and the output signal from the inverter 203 is at an H level and allows the input data to pass so that it is supplied to a master/slave latch 206.

The master/slave latch 206 is configured such that a latch portion consisting of a clocked inverter 207, inverters 208 and 209, and a latch portion consisting of a clocked inverter 210, inverters 211 and 212 are connected serially; the output end of the inverter 211 is placed in a feedback connection with the input end of the clocked inverter 207 via the transmission gate 205.

This way, the transmission gate 204 is turned on and the transmission gate 205 is off only when the non-executional signal DRUN is negated (L level) and the stop signal DSTOP#X is negated (H level); the input data is supplied to and latched in the master/slave latch 206 via the transmission gate 204. When either the non-executional signal DRUN or the stop signal DSTOP#X is active, the data latched in the master/slave latch 206 is maintained and the input data is not latched, because the transmission gate 204 is turned off and the transmission gate 205 is turned on.

The registers 81, 82, 84–86, 88, 93, 94, 101, and 105 shown in FIG. 3 are configured such that the gate circuit 201 of FIG. 11 is left out and such that they receive inputs of the control signals DCNT1#X and DCNT2#X corresponding to the inverter 202.

A 53-bit dividend data containing a hidden bit of the dividend N stored in the partial remainder register 89 of such a configuration is input into the addition/subtraction portion 96 inside a mantissa division portion 100. This mantissa division portion 100, where a division according to a large-radix non-recovery type division method is performed with a radix r set to be 16, comprises a divisor multiple generating portion 95, an adder/subtracter portion 96, a quotient predicting portion 97, a predicted quotient register 98 and a quotient correction portion 99, as shown in FIG. 3.

Accordingly, a total of 30 divisor multiple data are required including $-15 \times$ divisor, $-14 \times$ divisor, ..., $-1 \times$ divisor, $1 \times$ divisor, ..., $14 \times$ divisor, and $15 \times$ divisor. The divisor multiple generating portion 95 generates these 30 divisor multiple data.

Figure 12:
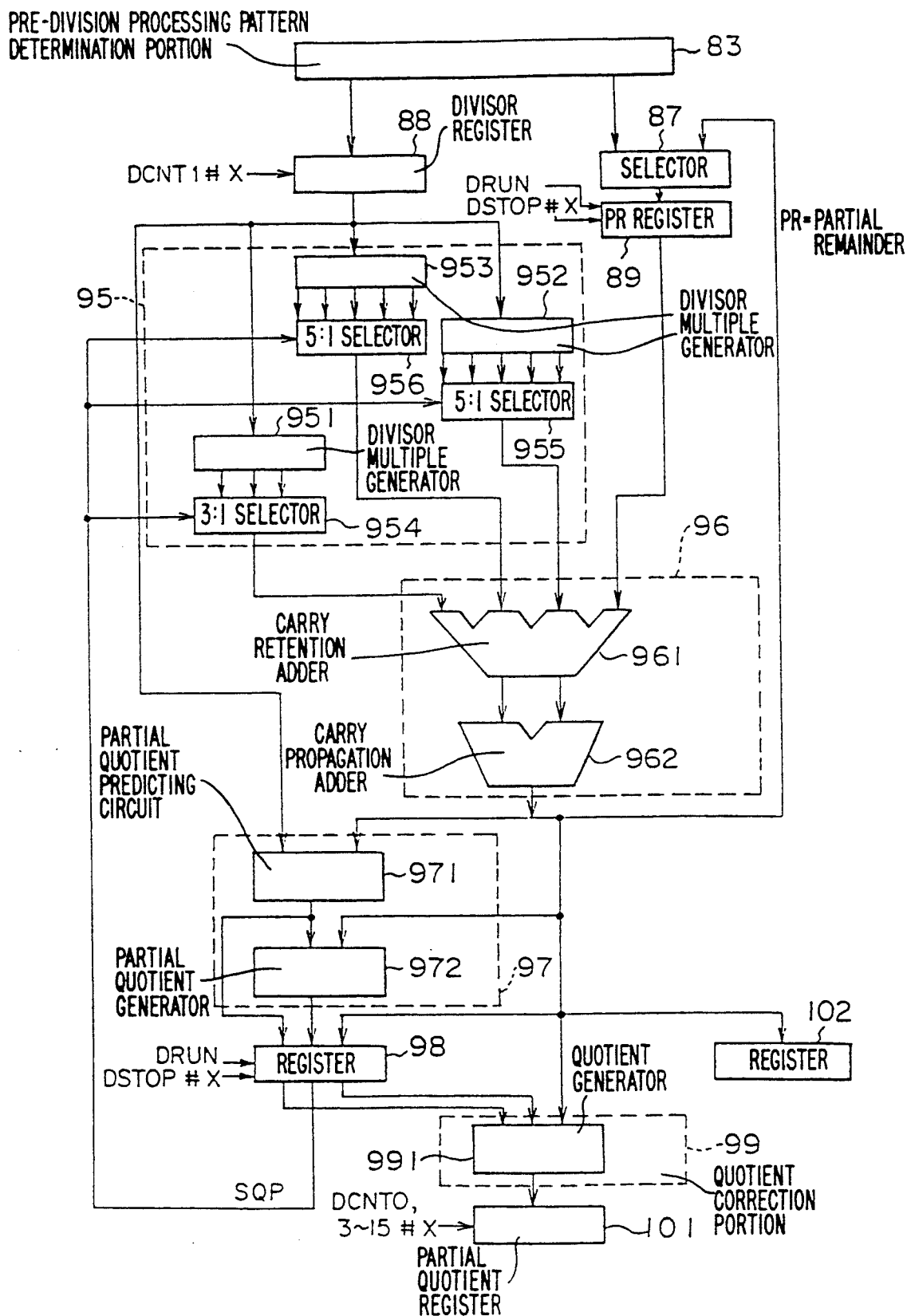
FIG. 12 is a diagram depicting a configuration of an embodiment of mantissa division portion of FIG. 3.

A description will be given below of a configuration and an operation of the mantissa division portion 100 by referring to FIG. 12. In the figure, parts that are the same parts in FIG. 3 are given the same reference numerals as in FIG. 3, and the descriptions thereof are omitted. Referring to FIG. 12, the divisor multiple generating portion 95 comprises: a divisor multiple generator 951, consisting of a shifter and a complement circuit, for generating $\pm 1$ multiple of the divisor by receiving as an input the divisor (the mantissa part $M_D$ of the divisor) from the divisor register 88; a divisor multiple generator 952 for generating $\pm 2/\pm 4$ multiples of the dividend; a divisor multiple generator 953 for generating $\pm 8/\pm 16$ multiples of the divisor; a 3:1 selector 954 for selecting one of the divisor multiples; a 5:1 selector 955; and a 5:1 selector 956.

The selectors 954, 955, and 956 select one of the divisor multiples on the basis of a quotient prediction signal SQP generated by the quotient predicting portion 97 described later and input via the predicted quotient register 98, and output the selected multiple to the adder/subtracter portion 96, wherein $+n$ multiplication is achieved by shifting only and $-n$ multiplication is achieved by shifting after complementation.

The adder/subtracter portion 96 comprises a 4-input carry retention adder 961 and a carry propagation adder 962 for adding a carry C and a sum S output from this adder 961, wherein a sum of three values selected by the selectors 954, 955, and 956 is subtracted from the contents of the aforementioned partial divisor register 89 and is designated as the partial remainder in the next cycle of operation.

The quotient predicting portion 97 consists of a partial quotient predicting circuit 971 and a partial quotient generator 972, wherein a digit-by-digit prediction of a partial quotient is conducted on the basis of the divisor from the divisor register 86 and the partial remainder from the adder/subtracter portion 96 so that the predicted quotient signal is set in the predicted quotient register 98, and the quotient prediction signal SQP is output.

The quotient correction portion 99 has a quotient generator 991, corrects the predicted partial quotient generated in the quotient prediction portion 97 on the basis of the sign of the partial remainder in the current cycle of operation and the sign of the partial remainder in the previous cycle of operation, and sets the corrected prediction in the partial quotient register 101.

In the present embodiment, the number of times the division is repeated is 15 for a 53-bit mantissa part data including a hidden bit. Since numerical values handled are a double-precision floating-point data of the format defined by the IEEE standard, a 56-bit quotient ($= 4$ bits $\times$ 14 digits) is obtained. Using the following parameters and functions, this division operation is standardized as follows:

parameters:

mantissa part of dividend : $N_M$
mantissa part of divisor : $D_M$
partial remainder : PR (i)
predicted partial quotient: QP (i)
partial quotient : Q (i)
functions: Predict (PR (i), $D_M$) predicted partial quotient QP (i) is obtained on the basis of the partial remainder PR (i) and the mantissa part of the divisor $D_M$ by referring to a prediction table.
initialization:
PR (0) = $N_M$
QP (0) = 0
first cycle.
PR (1) = PR (0) − QP (0) × $D_M$
QP (1) = Predict (PR (1), $D_M$)
second cycle:
PR (2) = PR (1) − QP (1) × $D_M$
QP (2) = Predict (PR(2), $D_M$)
Q (1) = QP (1) modified by PR (1) and sign bit of PR (2)
fourteenth cycle:
PR (14) = pR (13) − Qp (13) × $D_M$
Qp (14) = predict (PR (14), $D_M$)
Q (13) = Qp (13) modified by pR (13) and sign bit of PR (14)
fifteenth cycle:
PR (15) = PR (14) − QP (14) × $D_M$
Q (14) = QP (14) modified by PR (14) and sign bit of PR (15)

Figure 13:
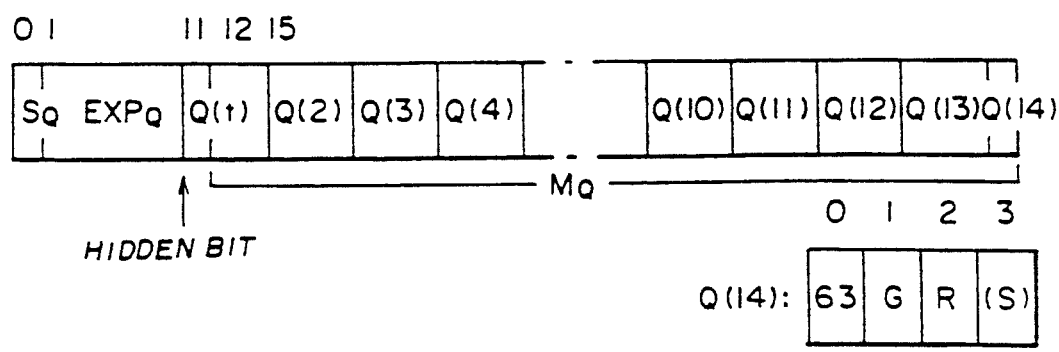
FIG. 13 is a diagram describing a bit-by-bit configuration of a partial quotient register.

In accordance with the above operations, the quotient is obtained as described in FIG. 13, and is set in the partial quotient register 101 in response to the control signal DCNT0, 3-15#X, wherein the last partial remainder PR (15) is retained in the remainder register 102.

Since the aforementioned pre-processing appends a hidden bit so that the absolute value of the mantissa part $M_N$ of the dividend N is smaller than the absolute value of the mantissa part $M_D$ of the divisor D, the 4-bit partial quotient Q (1) is always controlled to be in the range of hexadecimal 8 - F. Therefore, the 11th bit, the hidden bit, of the quotient Q is "1" and the obtained value is regarded as the final result unmodified. There is no need for a left shift for normalization; the bits used as the mantissa part of the final quotient are from the first bit of the partial quotient Q (1) through the 0th bit of the partial quotient Q (14).

Further, the first bit of the partial quotient Q (14) is a guard bit G, the second bit of the partial quotient Q (14) is a round bit R, an OR of the third bit of the partial quotient Q (14) and all the bits of the partial remainder PR (15) are so-called sticky bits S. The partial quotients Q (1)-Q (14) and the remainder PR (15) stored in the partial quotient register 101 and the remainder register 102 respectively are input into a rounded output determination portion 103 together with the data in the registers 93 and 94, as shown in FIG. 3.

This rounded output determination portion 103 performs a rounding operation defined by the IEEE standard so that the result of division has fewer digits than the predetermined value. Rounding operations defined by the IEEE standard include RN (Round Nearest), RP (Round Plus), RM (Round Minus), and RZ (Round Zero). These are used either to determine the one-bit value to be rounded by a prescribed operation expression on the basis of predetermined bits taken from any of the four kinds of bits, namely the guard bit G, the round bit R, the sticky bit S, or the sign bit, or to take advantage of the predetermined value. This embodiment allows a selection from these four methods of rounding.

When an operation is invalid, the rounded output determination portion 103 generates a prescribed pattern associated with it; when an exceptional case arises, it also generates a prescribed pattern associated with it so that the output value is controlled. Moreover, it generates an exceptional flag in accordance with the IEEE standard.

Figure 14:
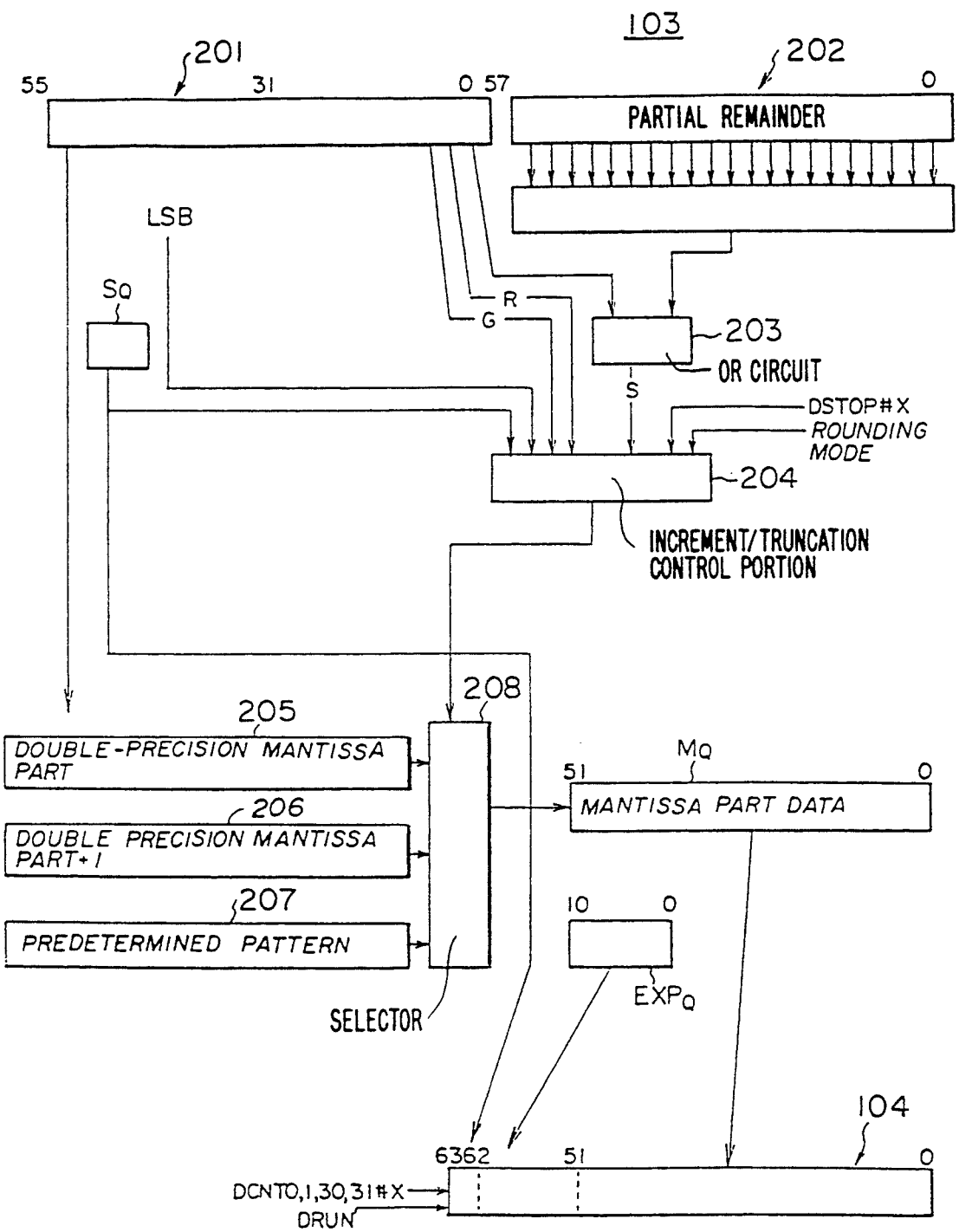
FIG. 14 is a diagram depicting a configuration of a round-off output determination portion of FIG. 3.

FIG. 14 is a diagram depicting a configuration of this rounded output determination portion 103. First, the third bit of the partial quotient Q (14) from the contents (the partial quotients Q (1)-Q (14)) of the partial quotient register 101, which contents are the result of operations in the mantissa division portion 100; and all the bits of the partial remainder PR (15) 202, which are the contents of the remainder register 102, are ORed by an OR circuit 203 so that the stick bit S is generated.

Subsequently, the sticky bit S, as well as the guard bit G, the round bit R, LSB, and the sign, is input into an increment/truncation control portion 204. The increment/truncation portion 204 gives a determination of either an increment or a truncation only when the stop signal DSTOP#X is negated, on the basis of a rounding mode signal indicating a mode of rounding (truncation, raising, for example), then selecting, by means of a selector 208, from any of the three kinds of data; namely the mantissa part $M_Q$ data 205 of the quotient Q, which is the unmodified result of the operation in the mantissa division portion 100, the data 206 which is a result of adding 1 to the mantissa part $M_Q$ of the quotient Q, and the prescribed pattern 207.

The three data 205-207 are processed in parallel with the above-mentioned determination. The sign $S_Q$ of the quotient Q is generated by XORing the signs of the divisor D and the dividend N in the XOR circuit 915. The selector 208 outputs the 52-bit mantissa part $M_Q$ of the final quotient Q, which part is set in the output register 104 as the quotient Q together with the 1-bit sign $S_Q$ of the quotient Q, and the 11-bit exponent part $EXP_Q$ of the quotient Q stored in the register 93. This output register 104 does not perform a latch when the non-executional signal is active. The execution flag generated in the rounded output determination portion 103 is set in the exception register 105 as shown in FIG. 3.

A sequential description of the above-mentioned processes is given by referring to FIG. 3 and the time charts of FIG. 15. After the start signal shown in FIG. 15 (B) is input, the input data (the divisor D and the dividend N) shown in FIG. 15 (C) are latched in the input registers 81 and 82 respectively at a machine cycle M1 (clock 0) shown in FIG. 15 (A) At a machine cycle M2, pre-division processing/pattern determination portion 83 performs a pre-processing on the input data as shown in FIG. 15 (D). As shown in FIG. 15 (E) and (F) schematically, the result of the pre-processing is latched in the input registers 85 and 86 in the exponent operation portion 91, the input registers of the mantissa division portion 100, namely the divisor register 88 and the partial remainder register 89.

At a machine cycle M3, a repetition of division operations on the contents latched in the divisor register 88 and the partial remainder register 89 is started in the mantissa division portion 100; that is the partial remainder PR (i) and the partial quotient Q (i) are computed in repetitive manner.

This computation updates the contents of the partial remainder register 89, as shown by R1-R15 of FIG. 15 (E); the content of the predicted quotient register 98 is updated as shown by QP1-QP14 of FIG. 15 (G); moreover, the content of the partial quotient register 101 is updated as shown by Q1-Q14 of FIG. 15 (H).

After the computation is repeated fifteen times, the repetition stops at a machine cycle M17. The following contents are input into the rounded output determination portion 103 for rounding operation; namely the content Q14 of the partial quotient register 101 which stores the mantissa part $Q_M$ of the quotient finally obtained; the content of the remainder register 102 which stores the final partial remainder PR (15); the content of the exponent register 93 which stores the exponent part $EXP_Q$ of the quotient; the content of the exception register 94 which stores information such as the exception flag. At a machine cycle 18, the final result is stored in the output register 104 as shown in FIG. 15 (I); the exception flag information associated with the output data is latched in the exception register 105 as shown in FIG. 15 (J).

A description will next be given of how the stop signal DSTOP#X, the non-executional signal DRUN, and the control signal DCNT0-15#X control division operations of each of the circuit portions.

First, when the output pattern of the mantissa part $M_Q$ of the quotient Q can be recognized in the exception/non-operation detecting portion 92 without performing operations on the mantissa part, that is, when a non-operational pattern according to the aforementioned IEEE standard is detected, the stop signal DSTOP#X is rendered active to turn negative the latch operations of the partial remainder register 89, the predicted quotient 98, and the rounded output determination portion 103 so that the switching of the circuit of the mantissa division portion 100 can not take place. That is, the stop signal DSTOP#X is input as the enable signal of the partial remainder register 89, the predicted quotient register 98, and the control portion 204 of the rounded output determination portion 103. When active, the stop signal does not latch. This way, power consumption in the partial remainder register 89, the predicted quotient register 89, and the control portion 204 is held low at the time of detecting the non-operational pattern.

Since the non-executional signal DRUN from the control portion 90 is rendered active when no division instruction is performed, the latch signals of the partial remainder register 89, the predicted quotient register 98, and the output register 104 are rendered invalid with the result that the circuits are not put into operation and the power consumption in the circuits is held low. That is, the non-executional signal DRUN is input as the enable signal of the partial remainder register 89, the predicted quotient register 98, and the output register 104. When the non-executional signal DRUN is active, the data are not latched.

Further, since the control signal DCNT1#X is input into the divisor register 88 and the pattern determination flag register 84, the control signal DCNT2#X into the exponent register 93 and the exception flag register 94, the control signals DCNT0, 3-15#X into the partial quotient register 101, the control signal DCNT0#X into the remainder register 102, the control signal DCNT1#X into the output register 104 and the exception register 105, the data are not latched when these control signals are negated. That is, when the division instruction is not executed, the count of the counter 120 of FIG. 5 is maintained fixed as described before, and the control signals DCNT0-15#X are negated. Thus the operations in each of the above-mentioned registers 88, 84, 93, 94, 101, 102, 104, and 105 are stopped when division instructions are not executed, thus reducing power consumption in those circuits.

POSSIBLE APPLICATION IN INDUSTRY

As described above, since the floating-point division circuit of the present invention is capable of performing divisions at a minimum power consumption, it is suitable for a division circuit designed for performing divisions at a rapid speed with a hardware configuration of relatively large scale, such as a division circuit employing a large-radix non-recovery type division method. The circuit of the present invention is also suitable for a rapid operation in a vector processor used in recent years.

I claim:

1. A floating-point division circuit comprising:
   a circuit portion conducting pre-division processing and pattern determination on each of floating-point data, including a divisor and a dividend;
   an exponent operation portion operating on exponent parts of floating-point data, including the divisor and the dividend subject to pre-processing by said circuit portion;
   an exponent/non-operation detecting portion determining a predetermined non-operational pattern on the basis of a result of pattern determination obtained in said circuit portion with regard to said divisor and the dividend, and generating a stop signal when said non-operational pattern is detected;
   a mantissa division portion into which mantissa parts of floating-point data, including said divisor and the dividend subject to pre-processing by said circuit portion, are input, wherein procedures based on a predetermined algorithm are repeated to generate a mantissa part data of a quotient; and
   quotient generating portions generating a quotient consisting of a predetermined number of bits on the basis of output data from said exponent operation portion, exception/non-operation detecting portion, and mantissa division portion wherein;
   said stop signal stops repeated operations of said mantissa division portion by stopping a latch operation of a register in said mantissa division portion.

2. A floating-point division circuit as claimed in claim 1, wherein
   said exception/non-operation detecting portion comprises:
   a logical circuit outputting a match signal when a combination of a pattern determination result on said divisor and a pattern determination result on said dividend matches any of a plurality of predetermined non-operational patterns; and
   a circuit generating a stop signal on the basis of a match signal from said logical circuit.

3. A floating-point division circuit as claimed in claim 1 comprising:
   a first register storing a partial remainder derived from mantissa parts of said dividend and said divisor output from said circuit portion; and a second register storing a mantissa part of said divisor, wherein
said stop signal is input into a register in said mantissa division portion and said first register as a signal for stopping a latch operation.

4. A floating-point division circuit as claimed in claim 3, wherein
said mantissa division portion comprises:
a divisor multiple generating portion generating a plurality of divisor multiple data with respect to a radix and on the basis of output data from said second register, and outputting a selected divisor multiple data;
an adder/subtracter portion performing addition and subtraction on an output data from said first register and divisor multiple data from said divisor multiple generating portion so that a partial remainder is obtained;
a quotient predicting portion predicting a partial quotient on the basis of a partial remainder output from said adder/subtracter portion and data from said second register, and generating a quotient prediction signal;
a third register, in which said partial quotient and a quotient prediction signal from said quotient predicting portion are set, wherein on e of a plurality of said divisor multiple data is selectively output on the basis of said quotient prediction signal; and
a quotient correction portion, into which a partial quotient from said third register and a partial remainder output from said adder/subtracter portion are input, so that said partial quotient is corrected, wherein
divisions are performed according to a large-radix non-recovery type division method by feedback inputting a partial remainder output from said adder/subtracter portion a predetermined number of times.

5. A floating-point division circuit comprising:
a circuit portion performing pre-division processing and pattern determination on floating point data, including a divisor and a dividend;
an exponent operation portion performing operations on exponent parts of floating-point data, including said divisor and said dividend subject to pre-processing by said circuit portion;
a control portion generating a non-executional signal that is active only when no instruction for division is performed;
a mantissa division portion, into which mantissa parts of floating-point data, including said divisor and dividend subject to pre-processing by said circuit portion, are input, generating mantissa part data of a quotient by performing repeated procedures based on a predetermined algorithm; and
a quotient generating circuit portion generating a quotient consisting of a predetermined number of bits on the basis of output data from said exponent operation portion and mantissa division portion, wherein
said non-executional signal stops repeated operations of said mantissa division portion by stopping latch operations of a register in said mantissa division portion.

6. A floating-point division circuit as claimed in claim 5, wherein
said control portion comprises:
a first flip-flop whose enable terminal receives an input of division start signal; and
a second flip-flop which receives, into a set terminal thereof, an output signal from said first flip-flop, receives, into a reset terminal thereof, an input of end-of-division signal, and outputs, after being put into a set status by an output signal from said first flip-flop, said non-executional signal that is maintained active until reset by said end-of-division signal.

7. A floating-point division circuit as claimed in claim 5 comprising:
a first register storing a partial remainder derived from mantissa parts of said dividend and divisor output from said circuit portion; and
a second register storing a mantissa part of said divisor, wherein
said non-executional signal is input into a register in said mantissa division portion and into said first register, as a signal for stopping a latch operation.

8. A floating-point division circuit as claimed in claim 7, wherein
said mantissa division portion comprises:
a divisor multiple generating portion generating a plurality of divisor multiple data with respect to a radix and on the basis of output data from said second register, and outputting a selected divisor multiple data;
an adder/subtracter portion performing addition and subtraction on an output data from said first register and divisor multiple data from said divisor multiple generating portion so that a partial remainder is obtained;
a quotient predicting portion predicting a partial quotient on the basis of a partial remainder output from said adder/subtracter portion and data from said adder/subtracter portion and data from said second register, and for generating a quotient prediction signal;
a third register, in which said partial quotient and a quotient prediction signal from said quotient predicting portion are set, wherein one of a plurality of said divisor multiple data is selectively output on the basis of said quotient prediction signal; and
a quotient correction portion, into which a partial quotient from said third register and a partial remainder output from said adder/subtracter portion are input, so that said partial quotient is corrected, wherein
divisions are performed according to a large-radix non-recovery type division method by feedback inputting a partial remainder output from said adder/subtracter portion a predetermined number of times.

9. A floating-point division circuit comprising:
a circuit portion performing pre-division processing and pattern determination on floating-point data, including a divisor and a dividend;
an exponent operation portion performing operations on exponent parts of floating-point data, including said divisor and said dividend subject to pre-processing by said circuit portion;
a control portion outputting a control signal on the basis of a count obtained by counting clocks while an instruction for division is executed, and maintaining said count fixed while an instruction for division is not executed by halting said count, invalidating said control signal;

a mantissa division portion into which mantissa parts of the floating-point data, including said divisor and said dividend subject to pre-processing by said circuit portion, are input wherein procedures based on a predetermined algorithm are repeated to generate a mantissa part data of a quotient; and a quotient generating circuit portion generating a quotient consisting of a predetermined number of bits on the basis of output data from said exponent operation portion and mantissa division portion, wherein said control signal controls a latch operation of a register in said quotient generating circuit portion.

10. A floating-point division circuit as claimed in claim 9, wherein said control portion comprises:

a control circuit generating a count control signal that is maintained active during a period beginning with an input of a start-of-division signal and ending with an input of an end-of-division signal; and a counter, whose enable terminal receives an input of said count control signal, wherein clocks are counted when said count control signal is active so as to generate said control signal.

11. A floating-point division circuit as claimed in claim 9, wherein said mantissa division portion comprises:

a divisor multiple generating portion generating a plurality of divisor multiple data with respect to a radix and on the basis of the mantissa part of said divisor, and outputting a selected divisor multiple data;

an adder/subtracter portion performing addition and subtraction on the partial remainder derived from the mantissa parts of said dividend and said divisor, and divisor multiple data from said divisor multiple generating portion so that a partial remainder is obtained;

a quotient portion predicting a partial quotient on the basis of a partial remainder output from said adder/subtracter portion and the mantissa part of said divisor, and generating a quotient prediction signal;

a third register, in which said partial quotient and a quotient prediction signal from said quotient predicting portion are set, wherein one of a plurality of said divisor multiple data is selectively output on the basis of said quotient prediction signal; and a quotient correction portion, into which a partial quotient from said third register and a partial remainder output from said adder/subtracter portion are input, so that said partial quotient is corrected, wherein divisions are performed according to a large-radix non-recovery type division method by feedback inputting a partial remainder output from said adder/subtracter portion a predetermined number of times.

12. A floating-point division circuit comprising:
a circuit portion performing pre-division processing and pattern determination on floating point data, including a divisor and a dividend;

an exponent operation portion performing operations on exponent parts of floating-point data, including said divisor and said dividend subject to pre-processing by said circuit portion;

an exception/non-operation detecting portion determining a predetermined non-operational pattern on the basis of a result of pattern determination obtained in said circuit portion with regard to said divisor and said dividend, and generating a stop signal when said non-operational pattern is detected;

a mantissa division portion into which mantissa parts of floating-point data, including said divisor said dividend subject to pre-processing by said circuit portion, are input wherein procedures based on a predetermined algorithm are repeated to generate a mantissa part data of a quotient; and quotient generating portions generating a quotient consisting of a predetermined number of bits on the basis of output data from said exponent operation portion, exception/non-operation detecting portion, and mantissa division portion, wherein said non-executional signal and stop signal stops repeated operations of said mantissa division portion by stopping a latch operation of a register in said mantissa division portion.

13. A floating-point division circuit comprising:
a circuit portion performing pre-division processing and pattern determination on floating-point data, including a divisor and a dividend;

an exponent operation portion performing operations on exponent parts of floating-point data, including said divisor and said dividend subject to pre-processing by said circuit portion;

a control portion which outputs a control signal;

an exceptional/non-operation detecting portion determining a predetermined non-operational pattern on the basis of a result of pattern determination obtained in said circuit portion with regard to said divisor and said dividend, and generating a stop signal when said non-operational pattern is detected;

a mantissa division portion into which mantissa parts of the floating-point data, including said divisor and said dividend subject to pre-processing by said circuit portion, are input wherein procedures based on a predetermined algorithm are repeated in order to generate a mantissa part data of a quotient; and a quotient generating circuit portion generating a quotient consisting of a predetermined number of bits on the basis of output data from said exponent operation portion, the exception/non-operation detecting portion, and the mantissa division portion, wherein said stop signal stops a latch operation of a register in said mantissa division portion, and said control signal controls a latch operation of a register in said quotient generating circuit portion.

14. A floating-point division circuit comprising:
a circuit portion performing pre-division processing and pattern determination on floating point data, including a divisor and a dividend;

an exponent operation portion for performing operations on exponent parts of floating-point data, including said divisor and said dividend subject to pre-processing by said circuit portion;

a control portion which outputs a control signal on the basis of a count obtained by counting clocks while an instruction for division is executed, and maintains said count fixed while an instruction for division is not executed by halting said count, invalidating said control signal outputting the non-executional signal that is active only when an instruction for division is not executed;

a mantissa division portion into which mantissa parts of the floating-point data, including said divisor and said dividend subject to pre-processing by said circuit portion, are input wherein procedures based on a predetermined algorithm are repeated in order to generate a mantissa part data of a quotient; and a quotient generating circuit portion generating a quotient consisting of a predetermined number of bits on the basis of output data from said exponent operation portion and mantissa division portion, wherein said stop signal stops a latch operation of a register in said mantissa division portion, and said control signal controls a latch operation of a register in said quotient generating circuit portion.

15. A floating-point division circuit comprising:

a circuit portion performing pre-division processing and pattern determination on floating-point data, including a divisor and a dividend;

an exponent operation portion performing operations on exponent parts of floating-point data, including said divisor and dividend subject to preprocessing by said circuit portion;

a control portion outputting a control signal on the basis of a count obtained by counting clocks while an instruction for division is executed, and maintaining said count fixed while an instruction for division is not executed by halting said count, invalidating said control signal outputting the non-executional signal that is active only when an instruction for division is not executed;

an exceptional/non-operation detecting portion determining a predetermined non-operational pattern on the basis of a result of pattern determination obtained in said circuit portion with regard to said divisor and said dividend, and generating a stop signal when said non-operational pattern is detected;

a mantissa division portion into which mantissa parts of the floating-point data, including said divisor and said dividend subject to pre-processing by said circuit portion, are input, wherein procedures based on a predetermined algorithm are repeated in order to generate a mantissa part data of a quotient; and a quotient generating circuit portion generating a quotient consisting of a predetermined number of bits on the basis of output data from said exponent operation portion, the exception/non-operation detecting portion, and the mantissa division portion, wherein said stop signal and a non-executional signal stops, when they are active, a latch operation of a register in said mantissa division portion, and said control signal controls a latch operation of a register in said quotient generating circuit portion.

16. A floating-point division circuit as claimed in claim 15, wherein said exception/non-operation detecting portion comprises:

a logical circuit outputting a match signal when a combination of a pattern determination result on said divisor and a pattern determination result on said dividend matches any of a plurality of predetermined non-operational patterns; and a circuit generating a stop signal on the basis of a match signal from said logical circuit.

17. A floating-point division circuit as claimed in claim 15, comprising:

a first register storing a partial remainder derived from mantissa parts of said dividend and divisor output from said circuit portion; and a second register storing a mantissa part of said divisor, wherein said stop signal and non-executional signal are input into a register in said mantissa division portion and said first register as a signal for stopping a latch operation.

18. A floating-point division circuit as claimed in claim 15, wherein:

said control portion comprises:

a control circuit generating said count control signal that is maintained active during a period beginning with an input of a start-of-division signal and ending with an input of an end-of-division signal, and said non-executional signal that is active before an input of said start-of-division signal and after an input of said end-of-division signal; and a counter, whose enable terminal receives an input of said count control signal, wherein clocks are counted when said count control signal is active so as to generate said control signal.

* * * * *

UNITED STATES PATENT AND TRADEMARK OFFICE
CERTIFICATE OF CORRECTION

PATENT NO. : 5,309,383
DATED : May 3, 1994
INVENTOR(S) : Koichi Kuroiwa

It is certified that error appears in the above-indentified patent and that said Letters Patent is hereby corrected as shown below:

Col. 1, line 46, change "q2." to --q2,--; and
        line 61, delete the "0".

Col. 3, line 60, after "a" insert --large circuit scale.--.

Col. 7, line 63, change "N" to subscript --$_N$--.

Col. 11, line 22, change "pR" to --PR--, and change "Qp" to --QP--;
        line 23, change "Qp" to --QP--, and change "predict" to --Predict--;
        line 24, change "Qp" to --QP--, and change "pR" to --PR--;
        line 61, after "include" insert --①--; and
        line 62, before "RP" insert --②--, before "RM" insert --③--, and before "RZ" insert --④--.

Col. 12, line 55, after "15(A)" insert --.--.

Col. 15, line 26, change "on e" to --one--.

Col. 17, line 43, before "portion predicting" insert --predicting--.

UNITED STATES PATENT AND TRADEMARK OFFICE
CERTIFICATE OF CORRECTION

PATENT NO. : 5,309,383

DATED : May 3, 1994

INVENTOR(S) : Koichi Kuroiwa

It is certified that error appears in the above-indentified patent and that said Letters Patent is hereby corrected as shown below:

Col. 18, line 13, after "divisor" insert --and--.

Signed and Sealed this

Thirteenth Day of September, 1994

*Attest:*

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,309,383
DATED : May 3, 1994
INVENTOR(S) : Koichi KUROIWA

It is certified that error appears in the above-indentified patent and that said Letters Patent is hereby corrected as shown below:

Title page, item [73] Assignee:

After "Fujitsu" insert --Limited--.

Signed and Sealed this

Twenty-fourth Day of September, 1996

Attest:

BRUCE LEHMAN

Attesting Officer     Commissioner of Patents and Trademarks